United States Patent
Marchio et al.

(10) Patent No.: US 9,077,056 B2
(45) Date of Patent: Jul. 7, 2015

(54) DEVICE FOR HOUSING ELECTROCHEMICAL CELLS

(75) Inventors: Michael A. Marchio, Clarkston, MI (US); Jozef Gorog, Troy, MI (US)

(73) Assignee: Battery Patent Trust, Wilmington, DE (US)

(*) Notice: Subject to any disclaimer, the term of this patent is extended or adjusted under 35 U.S.C. 154(b) by 1655 days.

(21) Appl. No.: 12/001,224

(22) Filed: Dec. 11, 2007

(65) Prior Publication Data
US 2009/0148754 A1 Jun. 11, 2009

(51) Int. Cl.
| | |
|---|---|
| H01M 10/36 | (2010.01) |
| H01M 2/00 | (2006.01) |
| H01M 10/613 | (2014.01) |
| H01M 2/10 | (2006.01) |
| H01M 10/615 | (2014.01) |
| H01M 10/6555 | (2014.01) |
| H01M 10/6556 | (2014.01) |
| H01M 10/6561 | (2014.01) |
| H01M 10/6567 | (2014.01) |

(52) U.S. Cl.
CPC ........ *H01M 10/5004* (2013.01); *H01M 2/1077* (2013.01); *H01M 2/1083* (2013.01); *H01M 10/5006* (2013.01); *H01M 10/5055* (2013.01); *H01M 10/5057* (2013.01); *H01M 10/5063* (2013.01); *H01M 10/5075* (2013.01)

(58) Field of Classification Search
CPC .............................. H01M 6/5038; G05D 23/00
USPC .............. 429/120, 71, 149, 151, 96–100, 148
See application file for complete search history.

(56) References Cited

U.S. PATENT DOCUMENTS

| | | | | |
|---|---|---|---|---|
| 2,905,447 | A * | 9/1959 | Huet | 165/165 |
| 4,510,215 | A * | 4/1985 | Adam | 429/99 |
| 4,846,263 | A * | 7/1989 | Miyazaki et al. | 165/104.26 |
| 5,985,483 | A * | 11/1999 | Verhoog et al. | 429/120 |
| 6,613,472 | B1 * | 9/2003 | Watanabe | 429/120 |
| 7,291,420 | B2 * | 11/2007 | Bitsche et al. | 429/120 |
| 2001/0046624 | A1 * | 11/2001 | Goto et al. | 429/99 |
| 2003/0232239 | A1 * | 12/2003 | Gow et al. | 429/120 |
| 2004/0069620 | A1 * | 4/2004 | Bitsche et al. | 204/228.6 |
| 2005/0058892 | A1 * | 3/2005 | Ovshinsky et al. | 429/120 |
| 2005/0170241 | A1 * | 8/2005 | German et al. | 429/120 |
| 2007/0141459 | A1 * | 6/2007 | Goto et al. | 429/159 |
| 2007/0264562 | A1 * | 11/2007 | Kang et al. | 429/96 |
| 2009/0155680 | A1 * | 6/2009 | Maguire et al. | 429/158 |

* cited by examiner

*Primary Examiner* — Ula C Ruddock
*Assistant Examiner* — Amanda Barrow
(74) *Attorney, Agent, or Firm* — Maginot Moore & Beck LLP

(57) ABSTRACT

Disclosed herein is a device for housing a plurality of electrochemical cells, wherein the housing provides stability, temperature control and maximum packing density. The battery module housing comprises a first semi-enclosure and a second semi-enclosure, wherein the first and second semi-enclosure are aligned to form compartments there between. Each compartment is designed to accommodate at least one electrochemical cell, such as a cylindrical battery or a prismatic battery. Each semi-enclosure comprises an interior wall and an exterior wall. The interior and exterior wall align together to form a flow path between the walls through which coolant or any other thermal management medium may flow. The coolant enters the semi-enclosure through a coolant inlet, flows between the interior and exterior walls; then flows out of the semi-enclosure through a coolant outlet.

11 Claims, 17 Drawing Sheets

DEVICE FOR HOUSING ELECTROCHEMICAL CELLS

FIELD OF THE INVENTION

The instant invention relates generally to improvements in rechargeable high performance batteries, modules and packs. Specifically, the invention relates to device for housing a plurality of cylindrical electrochemical cells, wherein the housing provides stability, temperature control and maximum packing density.

BACKGROUND OF THE INVENTION

Rechargeable batteries are used in a variety of industrial and commercial applications such as fork lifts, golf carts, uninterruptible power supplies, pure electric vehicles and hybrid electric vehicles. Vehicular applications include applications related to propulsion as well as applications related to starting, lighting and ignition.

One aspect of battery operation that is particularly important for electric vehicle and hybrid vehicle applications is that of thermal management. In both electric and hybrid vehicle applications individual electrochemical cells are bundled together in close proximity. Many cells are both electrically and thermally coupled together. Therefore, the batteries used in these applications may generate significant heat during operation. Sources of heat may include, ambient heat and resistive or $I^2R$ heating on charge and discharge, where I represents the current flowing into or out of the battery and R is the resistance of the battery.

A battery generates Joule's heat and reaction heat due to electrode reaction at charging and discharging operations. A module battery may include a series of cells having a large capacity and a pack battery may include a series of the module batteries. Each of these may be configured to include several tens to several hundreds of cells arranged in series or parallel. The cells, with an increased electric capacity and sealed configuration, increase the amount of heat accumulated, with the result that heat dissipation out of the battery is retarded and the generated heat is accumulated within the battery. Consequently, the internal temperature of such a battery rises by a degree more than that of a smaller battery.

In vehicular applications, another aspect of battery operation is the maximization of packing density to provide maximum energy in relation to volume and weight. Typically, vehicular applications provide a minimal amount of space to incorporate a battery system.

Currently there exists a need in the art for a battery module housing and cooling system that provides stability for individual battery modules and thermal management of the system, to reduce, among other things, overheating of the system, deformation of the casings and shock to the system, while increasing packing density. Further, there exists a need in the art for a battery module housing and cooling system that maximizes the energy density of the battery modules and provides thermal management for the overall system.

SUMMARY OF THE INVENTION

Disclosed herein is a battery module housing having a first semi-enclosure and a second semi-enclosure, wherein the first and second semi-enclosure are aligned to form compartments there between. Each compartment is designed to accommodate at least one electrochemical cell, such as a cylindrical battery or a prismatic battery. Preferably, the shape of each compartment is designed to correspond with the exterior form of the electrochemical cell disposed within the compartment to provide intimate contact between the electrochemical cell and the housing.

Each semi-enclosure comprises an interior wall and an exterior wall. The interior and exterior wall align together to form a flow path between the walls through which coolant or any other thermal management medium may flow. The coolant enters the semi-enclosure through a coolant inlet, flows between the interior and exterior walls; then flows out of the semi-enclosure through a coolant outlet. As the coolant flows between the interior and exterior walls, intimate contact between the interior wall and the electrochemical cells provides thermal management as heat produced by the electrochemical cells is drawn away by the coolant, transported away from the cells and out of the battery module. The fluid path may be manipulated by interior channels between the interior and exterior walls. Preferably, the compartments form a single column of electrochemical cells between the first and second semi-enclosure.

Preferably, each interior wall further comprises an interior wall protrusion which extends between the compartments and abuts the interior wall protrusion of the opposite mating semi-enclosure. Further, the protrusions of mating semi-enclosures are fastened by a securing mechanism, such as a locking pin.

The battery modules may be interlocked in a staggered formation to minimize space. The exterior portion of the exterior wall of each semi-enclosure further comprises a series of slots and slats which secure a plurality of module housings in place with respect to one another. This interlocking of module housings inhibits movement with respect to one another and provides improved packing density. Preferably, the module housings are aligned in a staggered formation to provide maximum packing density.

Disclosed herein in another embodiment is a battery module comprising a first end wall having an end wall semi-enclosure and an end plate, wherein the end wall semi-enclosure and the end plate align to form flow channels between said end wall semi-enclosure and the end plate. The first end wall may incorporate a manifold having an inlet and an outlet, through which coolant or other thermal management medium may flow into at out of the flow channels. The embodiment further comprise a second end wall having an end wall semi-enclosure and an end plate, wherein the end wall semi-enclosure and the end plate align to form flow channels between the end wall semi-enclosure and the end plate and wherein the first end wall and second end wall align to form a plurality of compartments. The second end wall may incorporate a manifold having an inlet and an outlet, through which coolant or other thermal management medium may flow into at out of the flow channels. Each compartment is designed to accommodate at least one electrochemical cell, such as a cylindrical battery or a prismatic battery. Preferably, the shape of each compartment is designed to correspond with the exterior form of the electrochemical cell disposed within the compartment to provide intimate contact between the electrochemical cell and the housing.

In another embodiment, more than one compartment may be set between the end walls by incorporating at least one stacking segment having a dual sided segment and semi-enclosure wall. The semi-enclosure wall is secured to an internal side of the dual sided segment to form at least one flow channel between the semi-enclosure wall and the internal side. At least one flow support may be set between the semi enclosure and the internal side. The flow support allows the coolant to be evenly distributed into intimate contact with the semi enclosure and the internal side and draw heat away from cells packed on either side of the stacking segment. Further, the flow support provides added structural support to the segment to withstand expansion from electrochemical cells as same charge and discharge. A top portion of the semi-enclosure may be sealed to the stacking segment manifold to allow the thermal management medium to flow through a desired pathway.

Embodiments of the invention provide uniform cell cooling by conforming the cell compartments of the housing to the shape of the cells. Embodiments of the invention provide dielectric isolation between the cell and the thermal management medium. Embodiments of the invention provide a modular design to promote easy serviceability by allowing convenient stacking and removal of individual modules. Embodiments of the invention provide a modular design which allows flexibility as far as battery pack size and energy needs of a given system. Embodiments of the invention allows for very compact packaging of cells as the modules are stacked next to one another. Embodiments of the invention provide alignment features to align and lock modules in relative position.

A plurality of battery housings of the present invention may be connected in series or parallel to produce a battery system having a desired power. The battery system may incorporate supporting electronics and subsystems to control and monitor the battery modules and/or electrochemical cells supported by the battery housings.

BRIEF DESCRIPTION OF THE DRAWINGS

In order to assist in the understanding of the various aspects of the present invention and various embodiments thereof, reference is now made to the appended drawings, in which like reference numerals refer to like elements. The drawings are exemplary only, and should not be construed as limiting the invention.

DETAILED DESCRIPTION OF EMBODIMENTS OF THE INVENTION

Figure 1:
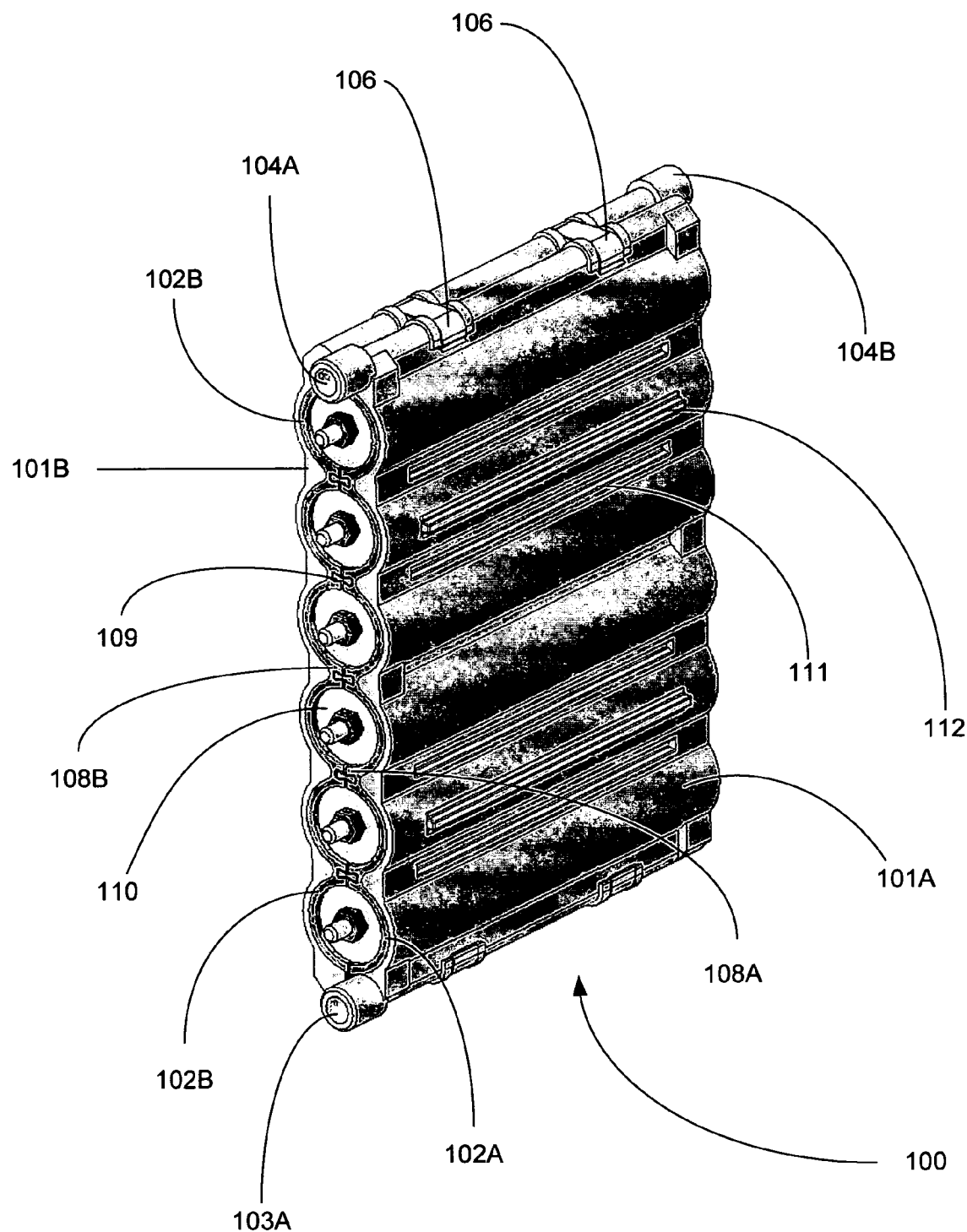
FIG. 1 is a perspective view of an embodiment of a battery module housing of the present invention, wherein cylindrical electrochemical cells are secured therein.
Figure 2:
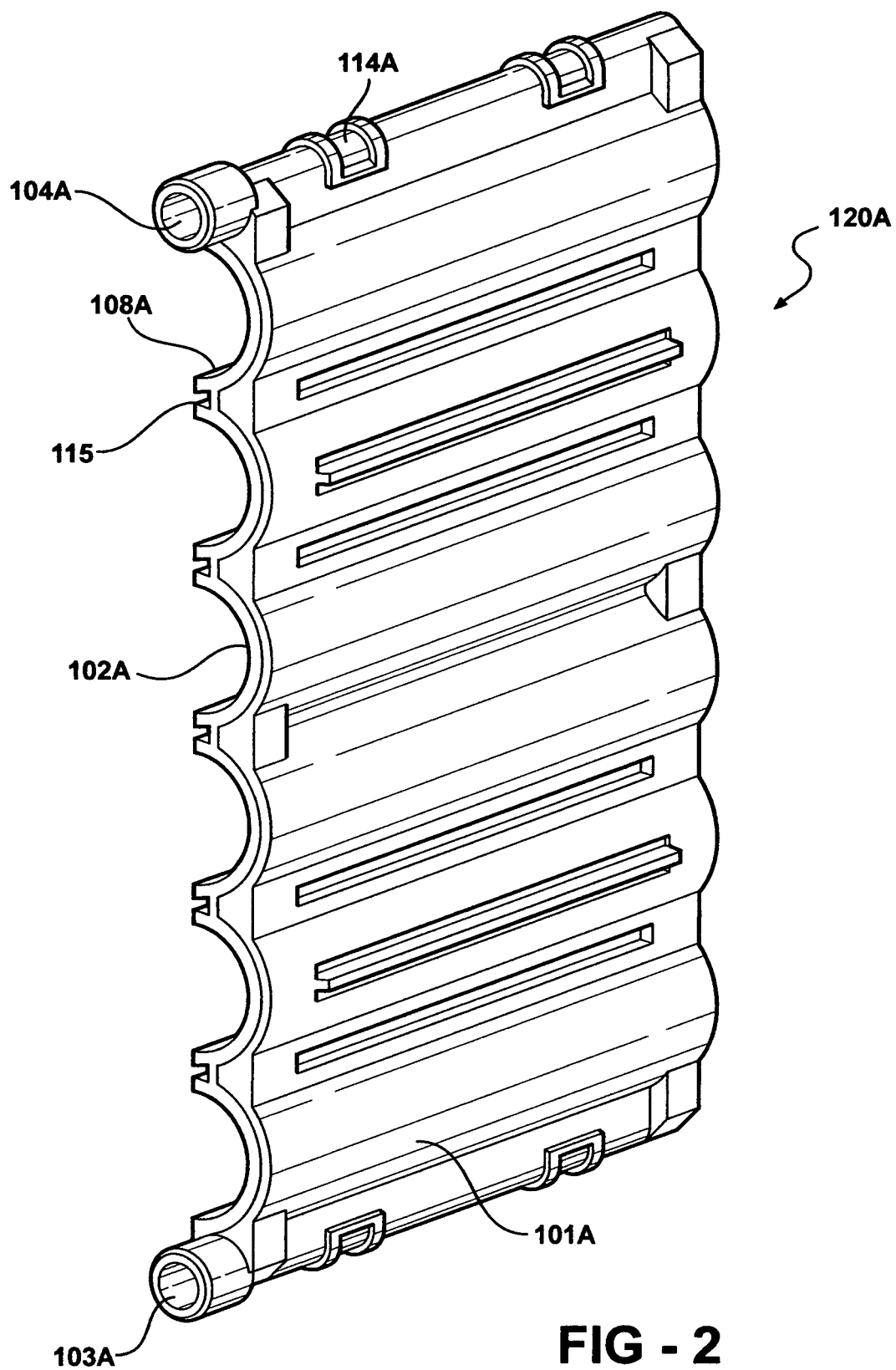
FIG. 2 is perspective view of an embodiment of a semi-enclosure of the present invention.
Figure 3:
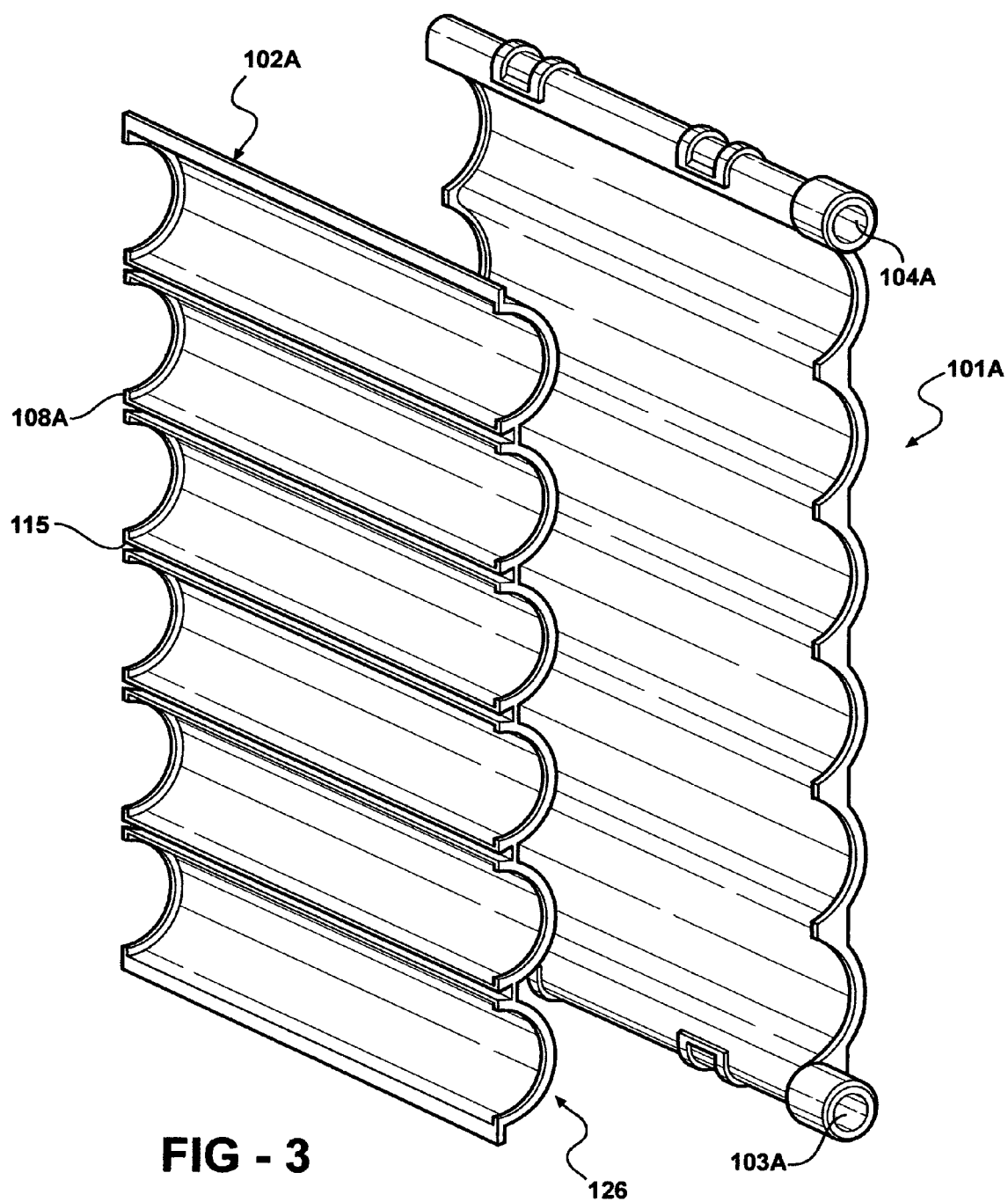
FIG. 3 is an exploded view of FIG. 2.
Figure 4:
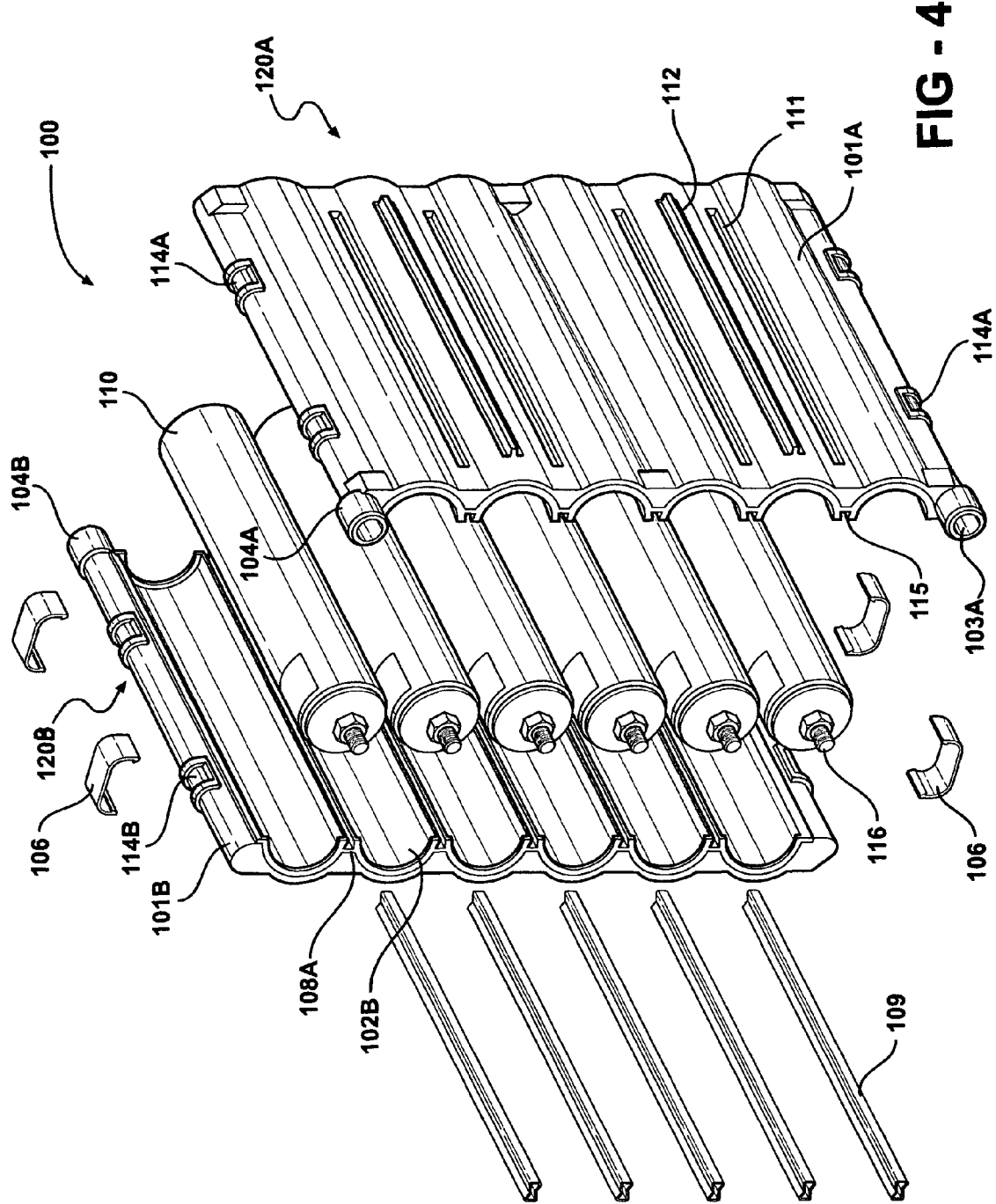
FIG. 4 is an exploded view of FIG. 1.

Referring to FIGS. 1 and 4, disclosed herein is a battery module housing 100 having a first semi-enclosure 120A and a second semi-enclosure 120B, wherein the first and second semi-enclosure are aligned to form compartments there between. Each compartment is designed to accommodate a single electrochemical cell 110, such as a cylindrical battery; however, the compartment may be designed accommodate other shapes, such as a prismatic battery. Preferably, the shape of each compartment is designed to correspond with the exterior form of the electrochemical cell 110 disposed within the compartment to provide intimate between the electrochemical cell 110 and the module housing 100.

Referring to FIGS. 1 through 4, each semi-enclosure 120A, 120B comprises an exterior wall 101A, 101B and an interior wall 102A, 102B. The exterior 101A, 101B and interior wall 102A, 102B align together to form a flow path between the walls through which coolant or any other thermal management medium may flow. The coolant enters the semi-enclosure through a coolant inlet 103A, 103B, flows between the exterior 101A, 101B and interior walls 102A, 102B; then flows out of the semi-enclosure 120A, 120B through a coolant outlet 104A, 104B. As the coolant flows between the interior and exterior walls, generally referred to as 126 in FIG. 3, intimate contact between the interior walls 102A, 102B and the electrochemical cells 110 provides thermal management as heat produced by the electrochemical cells 110 is drawn away by the coolant and transported away from the cells 110. Preferably, the compartments form a single column of electrochemical cells 110 between the first and second semi-enclosure 120A and 120B. Preferably, the first and second semi-enclosures 120A and 120B are identical. This is particular useful to provide a battery housing in which a minimal number of machined parts are necessary.

In a preferred embodiment, the first interior wall protrusion 108A and the second interior wall protrusion 108B contact one another forming a cavity 115 between the protrusions 108A and 108B. Preferably, the cavity 115 has a length equal to the width of the interior walls 102A and 102B and is shaped to accept a locking pin 109. Further, once the locking pin 109 is inserted into place the protrusions 108A and 108B are fixed into position relative to one another and the electrochemical cells 110 are secured into place within the respective compartment. Preferably, the locking pin 109 is inserted into the cavity 115 through the entire width of the interior walls 102A and 102B. The locking pin 109 may be fastened by the shape of the locking pin 109 relative to the cavity 115 or other mechanical means, such as epoxy, ball and socket or clip mechanism.

To further assist in securing the cells 110 within the modular housing 100, clamps may be incorporated. A clamp 106 expands to position around a recessed portion 114A and 114B of the first exterior wall 101A and the second exterior wall 101B and the clamp 106 snaps into the recessed portions 114A and 114B. When the clamp 106 snaps into place the semi-enclosures 120A and 120B are secured relative to one another. A plurality of clamps and recessed portion may be used.

In other embodiments, the locking pin may not be required. For example, the locking function may be provided by having the first interior wall protrusion designed with a cavity across the length for accepting a extension across the length of the second interior wall protrusion.

The interior and exterior walls 101A, 101B and 102A, 102B may be secured or attached by any practical means. For example, in one embodiment the peripheral connection points are welded at the seams. The welding may be any welding method known in the art, such as vibration welding and laser welding. In another embodiment, the peripheral connection points of the walls are secured by epoxy or other securing medium. In another embodiment, the peripheral connection points of the walls are affixed by clamping the semi-enclosures together and securing the interior wall to the exterior wall. In another embodiment, the peripheral connection points of the walls, wherein the interior wall connection points are designed with slots for accepting protrusions of the exterior wall at the connection points and the slots are layered with rubber or other soft liquid resistant material to inhibit the cooling medium from leaking from the intended flow path.

Figure 5:
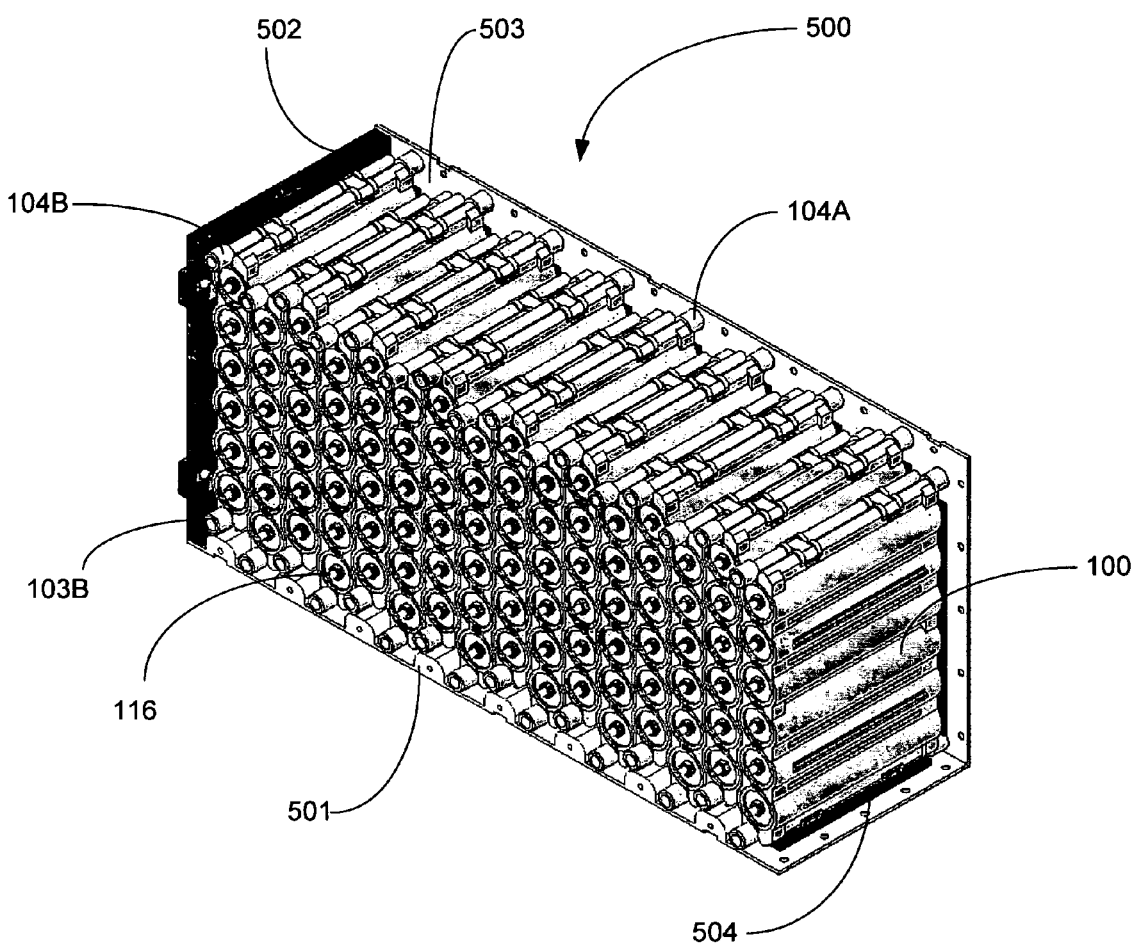
FIG. 5 is a perspective view of an embodiment of a plurality of battery module housings of the present invention coupled to form a battery system.

A preferred embodiment of the module of the present invention incorporates provides a module interlock mechanism, which provides stability and stackability. Referring to FIG. 1, the module interlock mechanism comprises a series of slots 111 and slats 112, which are preferably incorporated into the exterior portion of the exterior walls 102A and 102B. As a series of battery modules 110 are stacked and aligned, as illustrated in FIG. 5, the adjoining battery modules interlock by incorporating a series of slots 111 and slats 112, wherein the slats 112 set into slots 111. This interlocking system allows the battery housing to be securely positioned to one another. Further, any desired number of battery modules may be quickly and conveniently stacked to accommodate the power needs of a given system. For example, referring to FIG. 5, a battery system 500 is illustrated, wherein the battery system 500 is composed of an interlocking series of 16 battery modules of an embodiment of the present invention. Although the embodiments of the battery packs and battery modules shown are composed of linearly interlocked secondary batteries of cylindrical batteries, it should be appreciated, however, that the battery packs and battery modules may be composed of linearly interlocked secondary batteries of prismatic batteries. Filler 504 may be set between the outermost battery module housing 100 and the base 501 of the battery system 500 to stabilize any uneven segments. The filler 504 is preferably hard rubber, plastic or other material that allows the battery module housing 100 to expand.

To perform the thermal management function, the flow path between the exterior 101A, 101B and interior wall 102A, 102B circulates a coolant which flows through the flow path. Generally, the coolant is a fluid. That is, the coolant may be a gas or a liquid. An example of a gaseous coolant is air. Examples of liquid coolants are water or a water/glycol mixture. Preferably, the coolant is a liquid and the coolant channel is appropriately adapted for liquid circulation. As noted above, while it is preferable that the coolant be used to transfer heat away from the electrochemical cells, it is also possible that a coolant be used to transfer heat to the electrochemical cells.

Referring to FIGS. 12 through 15, illustrated is an embodiment wherein the inlet 1205 and outlet 1206 are integrated into the same side of a stacking segment, generally referred to as 1200, having opposing exterior walls to form compartments for electrochemical cells. Preferably, the inlet 1205 and outlet 1206 are integrated as segments of a stacking segment manifold 1209. Opposing exterior walls are formed by a semi enclosure 1202 and a dual sided segment 1201. Preferably, the semi enclosure 1202 is secured to the dual sided segment 1201 to form an airtight seal around the periphery of the stacking segment 1200 which allows the flow of coolant between the semi enclosure 1202 and the internal side 1212 of the dual sided segment 1201.

Figure 12:
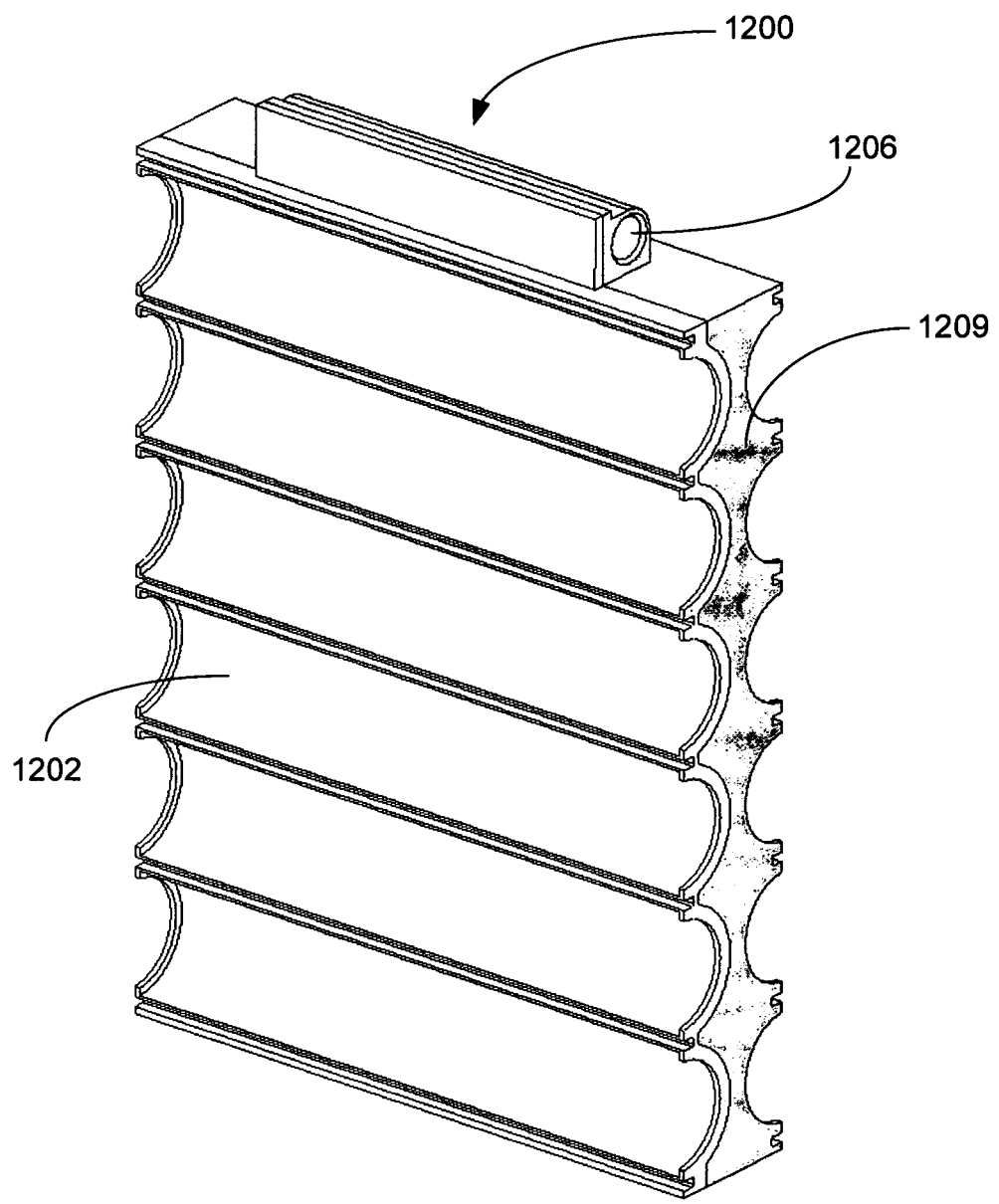
FIG. 12 is a perspective view of an embodiment of a stacking segment, the stacking segment having the coolant inlet and coolant outlet integrated into the same side.

At least one coolant flow channel is integrated between the semi enclosure 1202 and the internal side 1212 of the dual sided segment 1201 to guide the flow of coolant or any other thermal management medium from the inlet 1205, between the semi enclosure 1202 and the dual sided segment 1201, and to the outlet 1206. The embodiment illustrated in FIG. 12 shows one flow channel formed by a partition 1210 that extends from the stacking segment manifold 1209 to a point between the semi enclosure 1202 and the internal side 1212 of the dual sided segment 1201. The partition 1210 directs the flow of the thermal management medium from the inlet 1205, through the flow channel 1211, and to the outlet 1206.

Figure 13:
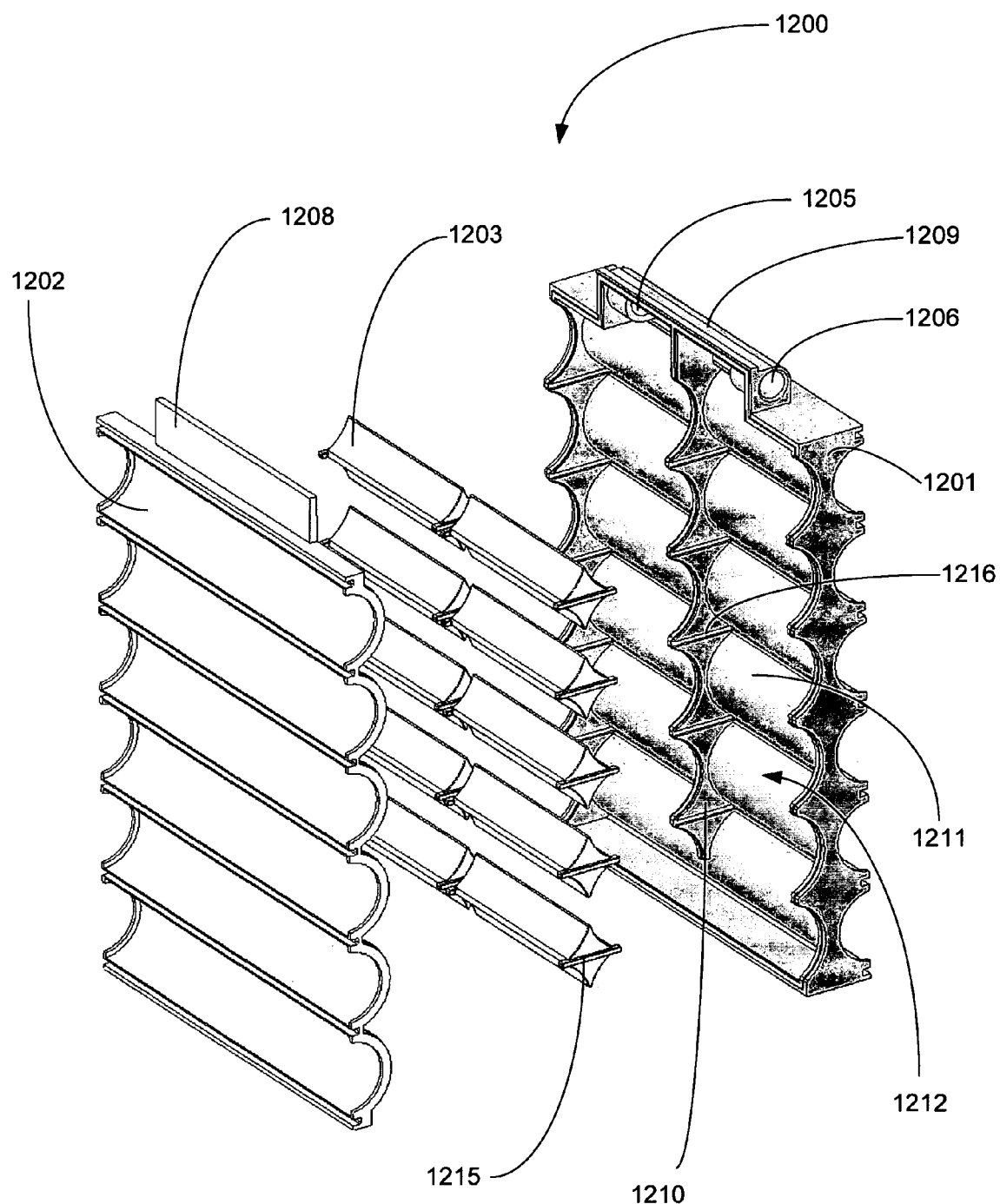
FIG. 13 is an exploded view of FIG. 12.
Figure 14:
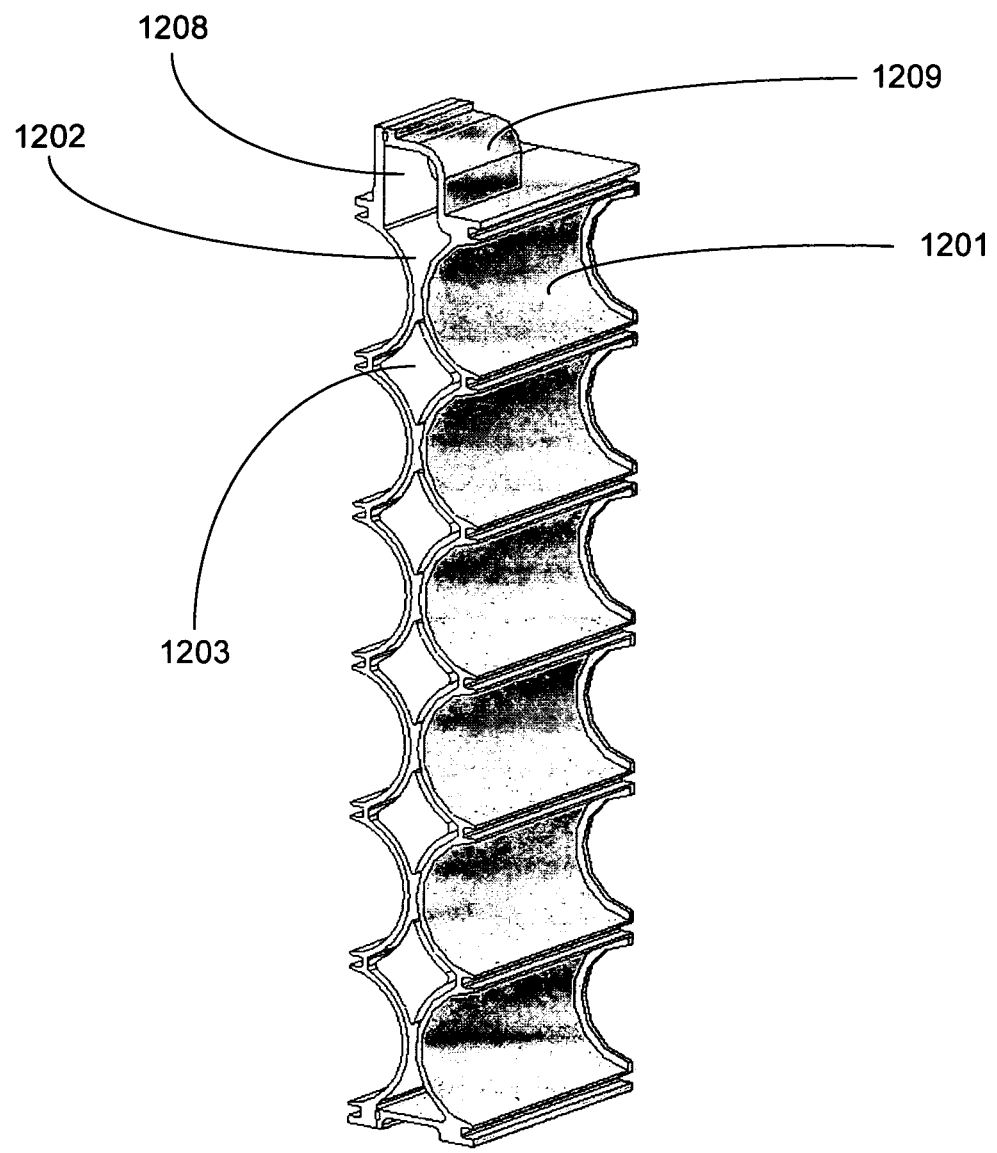
FIG. 14 is a cross sectional view of FIG. 12.

At least one flow support 1203 may be set between the semi enclosure 1202 and the internal side 1212 of the dual sided segment 1201. The flow support 1203 allows the coolant to be evenly distributed into intimate contact with the semi enclosure 1202 and the internal side 1212 of the dual sided segment 1201 and provides added structural support to the segment to withstand expansion from electrochemical cells as same charge and discharge. The flow support 1203 allows the coolant to be evenly distributed into intimate contact with the semi enclosure 1202 and the internal side 1212 and draw heat away from cells packed on either side of the stacking segment 1200. The flow supports 1203 may be secured any practical mechanical or chemical means, such as adhesive. As shown in FIG. 13, the flow supports 1203 may be secured by having at least one flow support slat 1215 connected to said flow support 1203, wherein the slat 1215 is set into a slot 1216. A top portion 1208 of the semi-enclosure 1201 may be sealed to the stacking segment manifold 1209 to allow the thermal management medium to flow through a desired pathway.

Figure 15A:
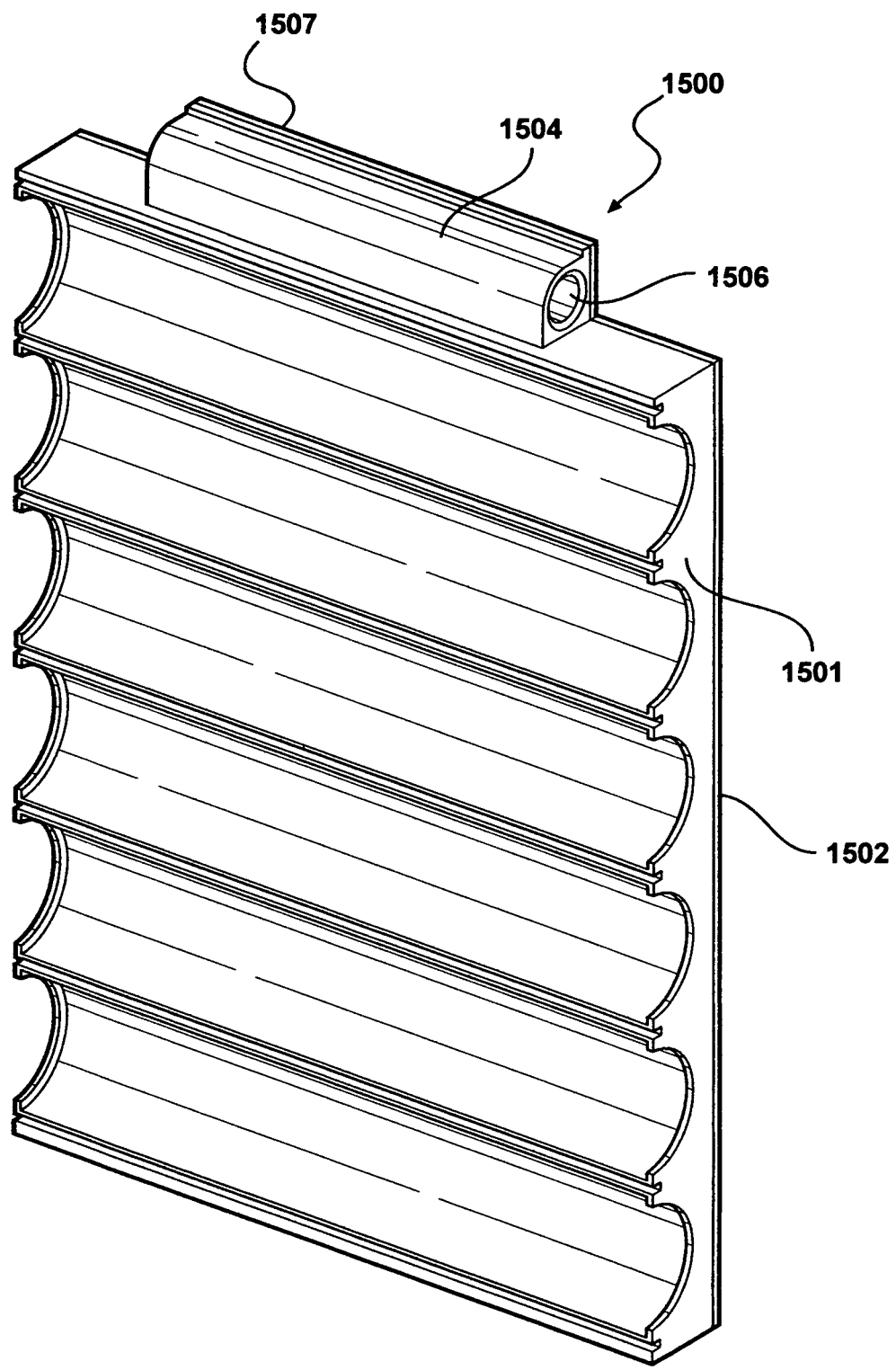
FIG. 15A is a perspective view of the semi-enclosure side of an embodiment of a end wall, the semi-enclosure having the coolant inlet and coolant outlet integrated into the same side.
Figure 15B:
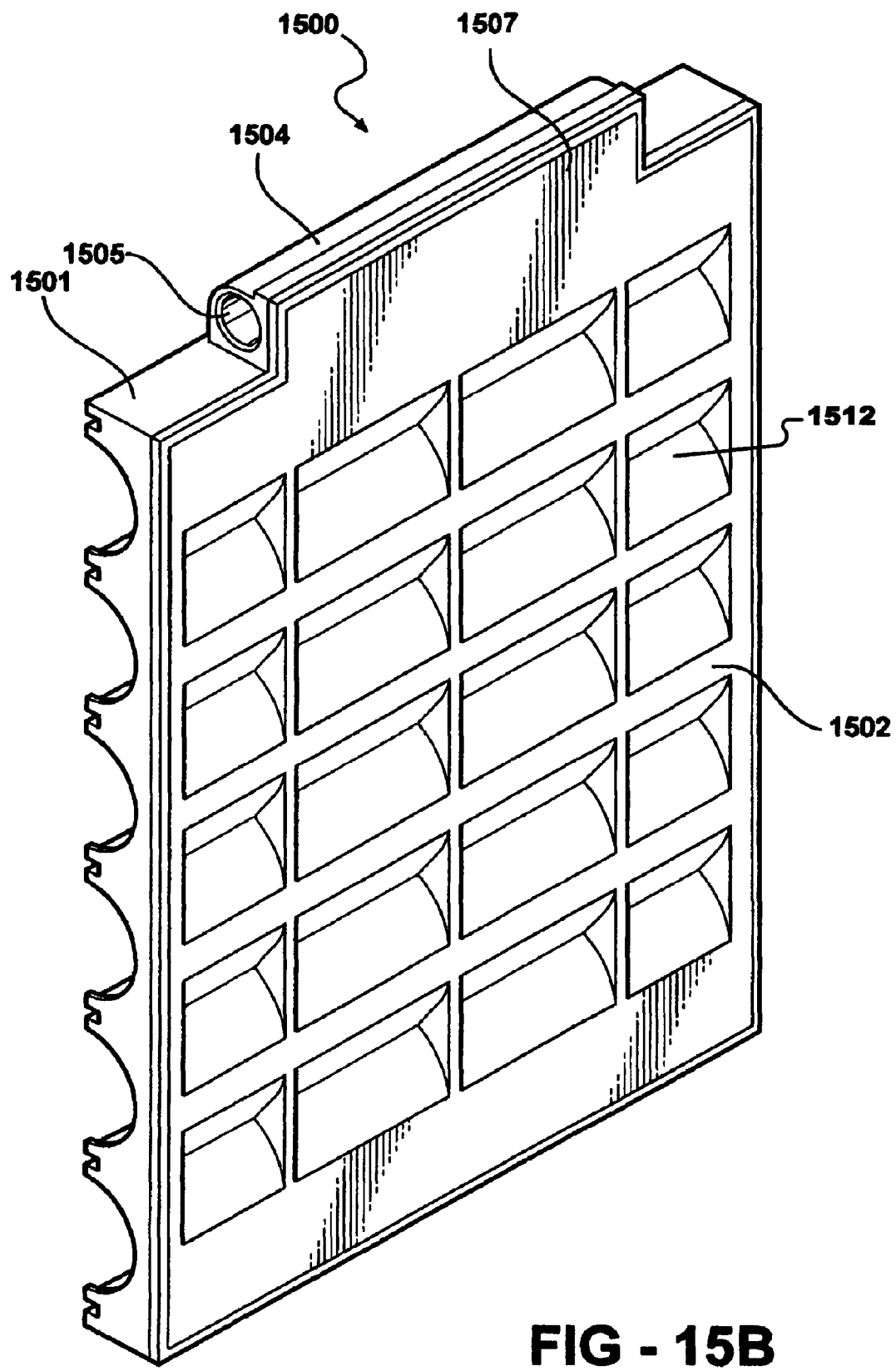
FIG. 15B is a perspective view of the end plate side of an embodiment of a end wall, the semi-enclosure having the coolant inlet and coolant outlet integrated into the same side.
Figure 16:
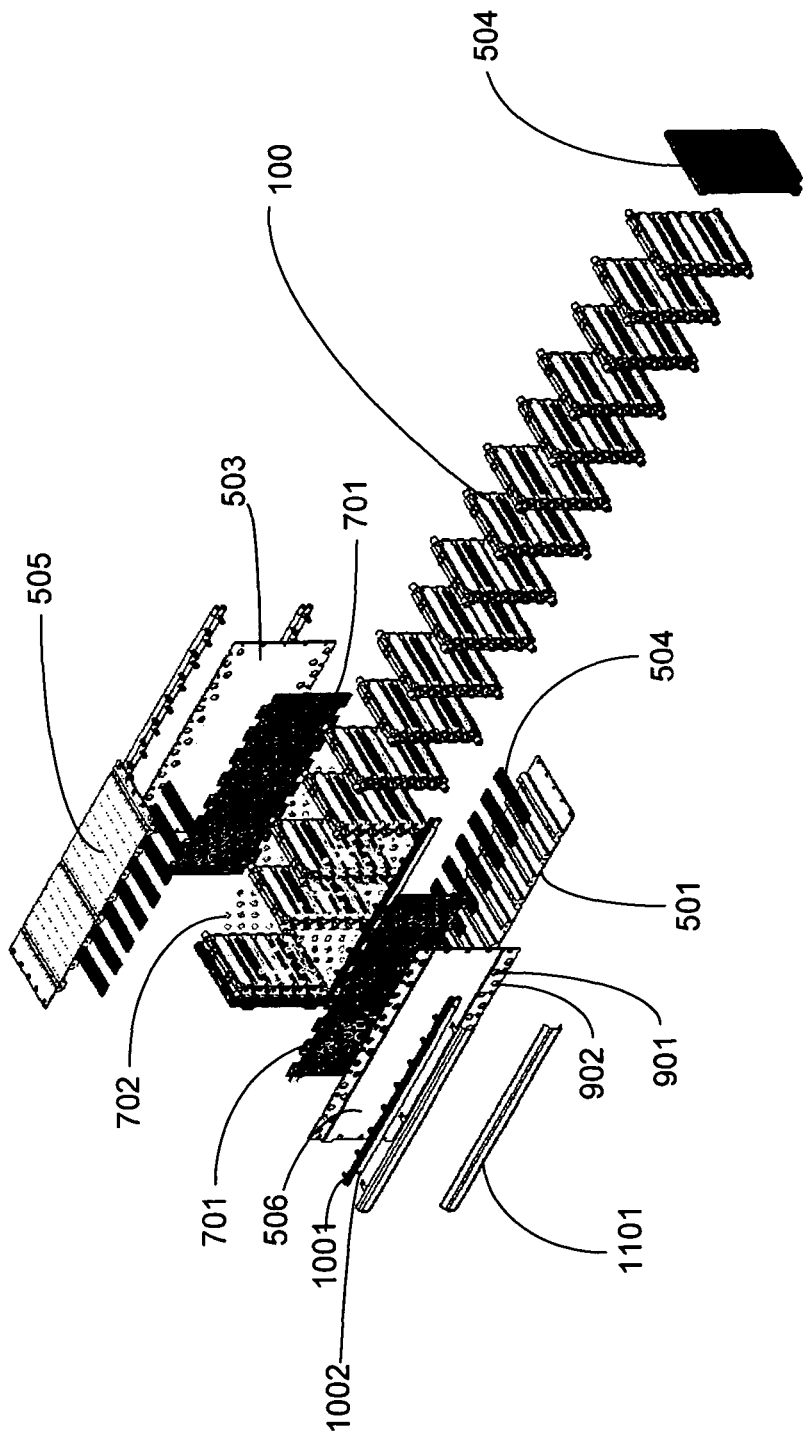
FIG. 16 is an exploded view of FIG. 11.

Referring to FIGS. 15A and 15B, an end wall 1500 is shown having an end wall semi-enclosure 1501 and an end plate 1502, wherein the end wall semi-enclosure 1501 and the end plate 1502 align to form flow channels between said end wall semi-enclosure 1501 and the end plate 1502. Preferably, the end wall 1500 incorporates an end wall manifold 1504 having an inlet 1505 and an outlet 1506, wherein the top portion of the end plate 1507 retains the thermal management medium in the end wall manifold 1504. The end plate 1502 may further include indentations 1512 that correspond to the shape of the inner portion of the semi-enclosure 1501, which directs the flow of thermal management medium into intimate contact with the inner portion of the semi-enclosure 1501. The indentations 1512 also decreases the amount of coolant needed to cool the system by forming a precise uniform pathway for the coolant to flow.

Two end walls 1500 as described above may be aligned to form a plurality of compartments, in which electrochemical cells are disposed in each of the compartments. Preferably, the shape of each compartment is designed to correspond with the exterior form of the electrochemical cell disposed within the compartment to provide intimate contact between the electrochemical cell and the module housing 1200 or end wall 1500. A plurality of module housings 1200 may be stacked proximate to one another to meet the power need of a given system with an end plate 1500 secured to each end of the stack.

Figure 6:
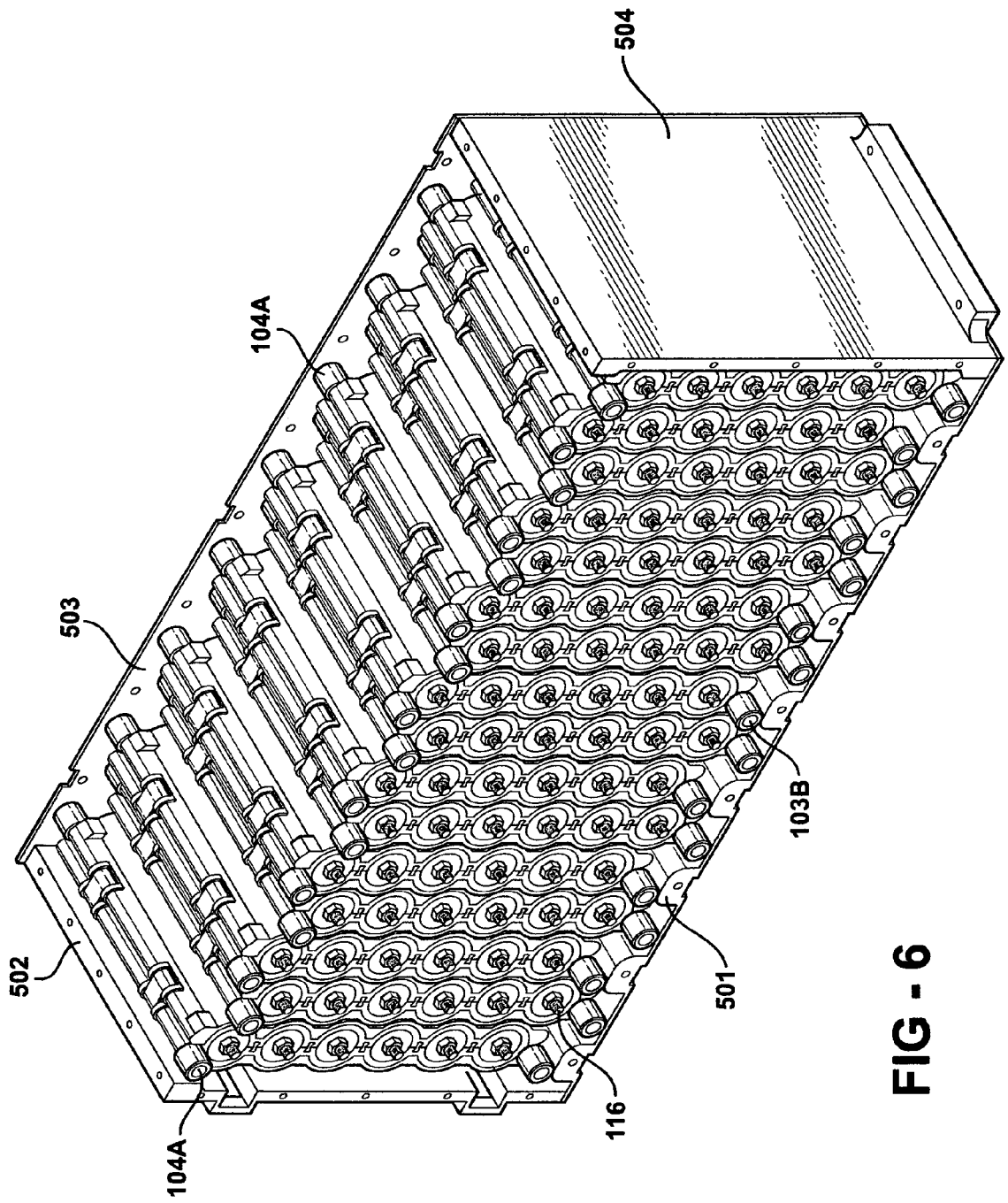
FIG. 6 is a perspective view of an embodiment of a plurality of battery module housings of the present invention coupled to form a battery system.
Figure 7:
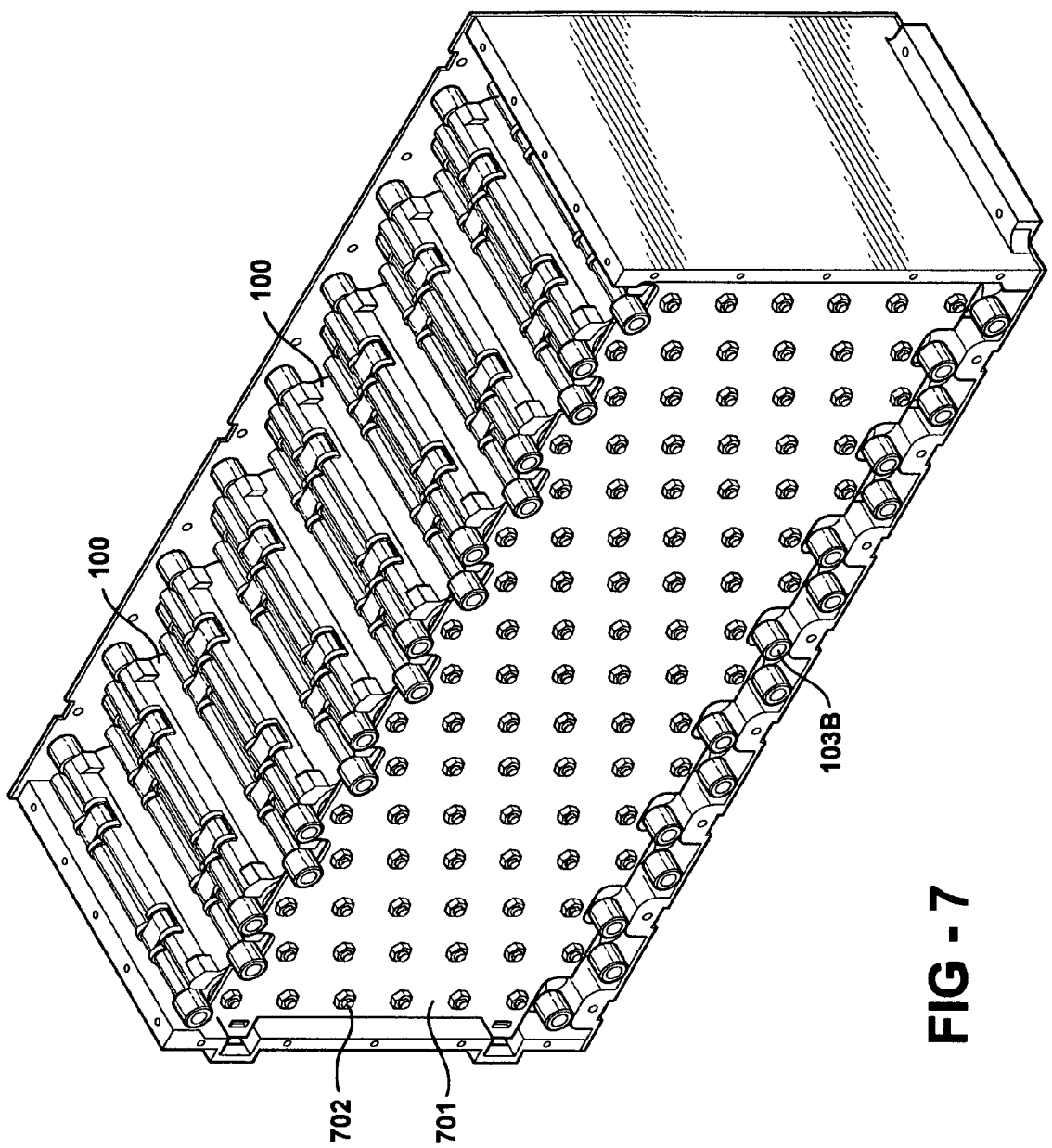
FIG. 7 is a perspective view of an embodiment of a plurality of battery module housings of the present invention coupled to form a battery system, the battery system having a data collection panel.

Referring to FIGS. 5 through 7, with respect to the first semi-enclosure, the coolant inlet and coolant outlet extend laterally in a direction opposite from the coolant inlet and coolant outlet of the second semi-enclosure. This design allows for a manifold to be incorporated into a battery system housing. Preferably, the inlets are positioned above the outlets to allow gravity to assist in forcing the coolant through the system. In another embodiment, the coolant inlet and coolant outlet of the first semi-enclosure extend laterally in a same direction as the coolant inlet and coolant outlet of the second semi-enclosure.

Figure 8:
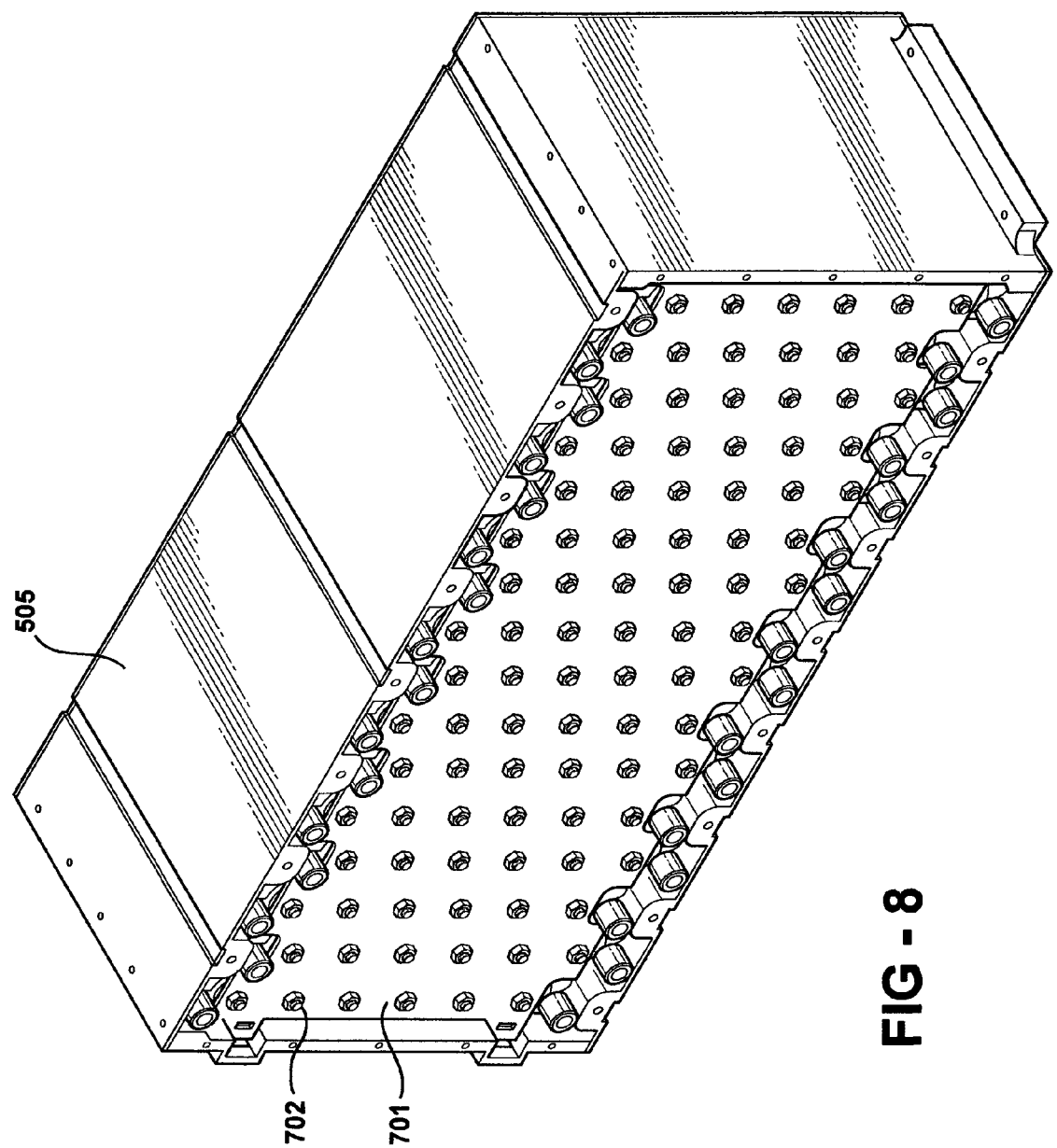
FIG. 8 is a perspective view of an embodiment of a plurality of battery module housings of the present invention coupled to form a battery system, the battery system having a data collection panel.

Referring to FIGS. 7 and 8, a data collection panel 701 is preferably incorporated into the battery system 700, wherein the data collection panel 701 is in electrical communication with each battery module 100. One function of the data collection panel 701 is to transfer electrical current to the battery modules 100 and/or electrochemical cells from a positive terminal (not shown) and from the battery modules 100 and/or electrochemical cells to the negative terminal (not shown). Another function of the data collection panel 701 is to transmit status information, such as battery temperature and battery voltage, through traces from the battery modules 100 and/or electrochemical cells to a battery control module (BCM) (not shown). In a preferred embodiment, at least one temperature sensor is integrated into the data collection panel 701 to detect the temperature of the battery modules 100 and/or electrochemical cells. The data collection panel 701 may be designed to transmit any status information which a user desires to collect regarding the battery modules, battery cells and the surrounding area. For example, gas sensors or moisture sensors may be integrated into the data collection panel 701, which may be in turn transmit the information to a master control module. Preferably, each cell terminal 116 is in electrical communication with module terminal connectors 702. The module terminal connectors 702 transmit electrical current from the battery modules and/or electrochemical cells to the data collection panel 701, where the electrical current may be further transmitted to a positive terminal.

The BCM provides functions such as internal data communications, external data communications, measurement of battery system voltage and current, control of the battery pack contactors, battery operating system and battery algorithms that monitor battery status as well as predict battery performance to allow effective control of the battery system by the system controllers. The BCM is preferably in a centralized collection point for monitoring of the system and receives information that is collected by the data collection panel 701. The BCM is preferably constructed of a plastic that is able to withstand the pressures and temperatures of the system. The preferred plastic is a thermoplastic resin.

Figure 9:
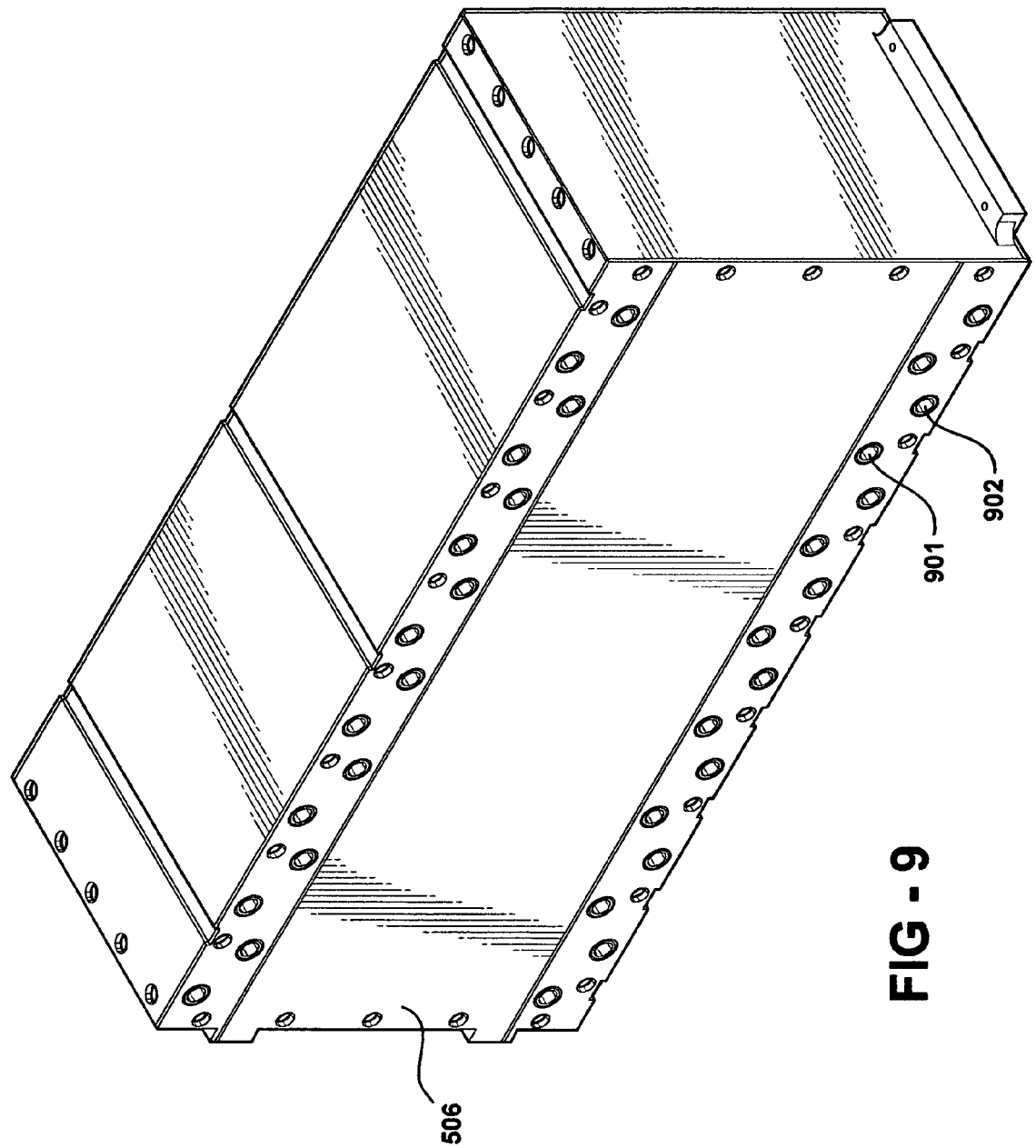
FIG. 9 is a perspective view of a battery system, the battery system enclosure having plurality of coolant inlets and coolant outlets.
Figure 10:
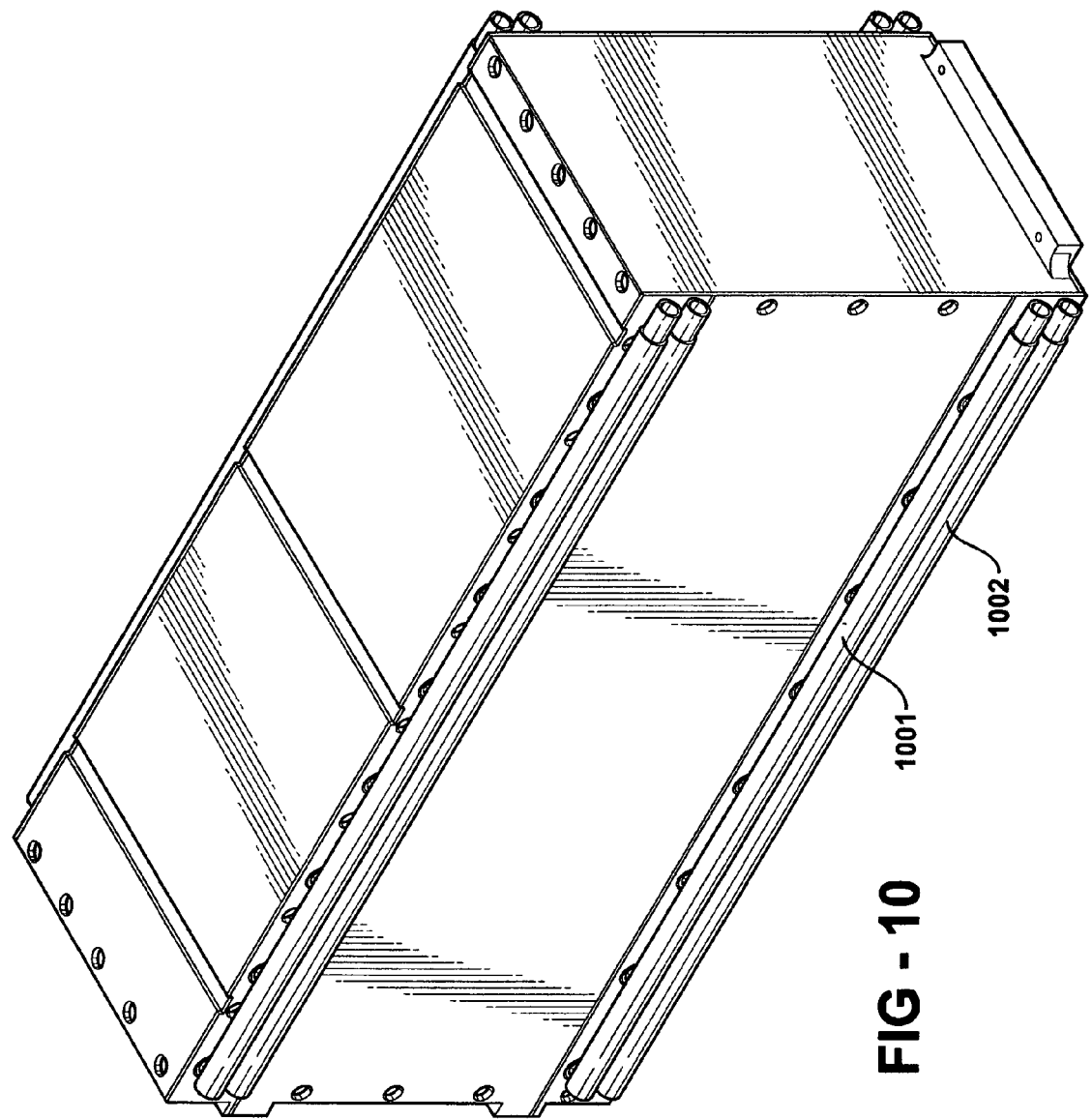
FIG. 10 is a perspective view of a battery system, the battery system having flow channels connected to the enclosure coolant inlets and coolant outlets.
Figure 11:
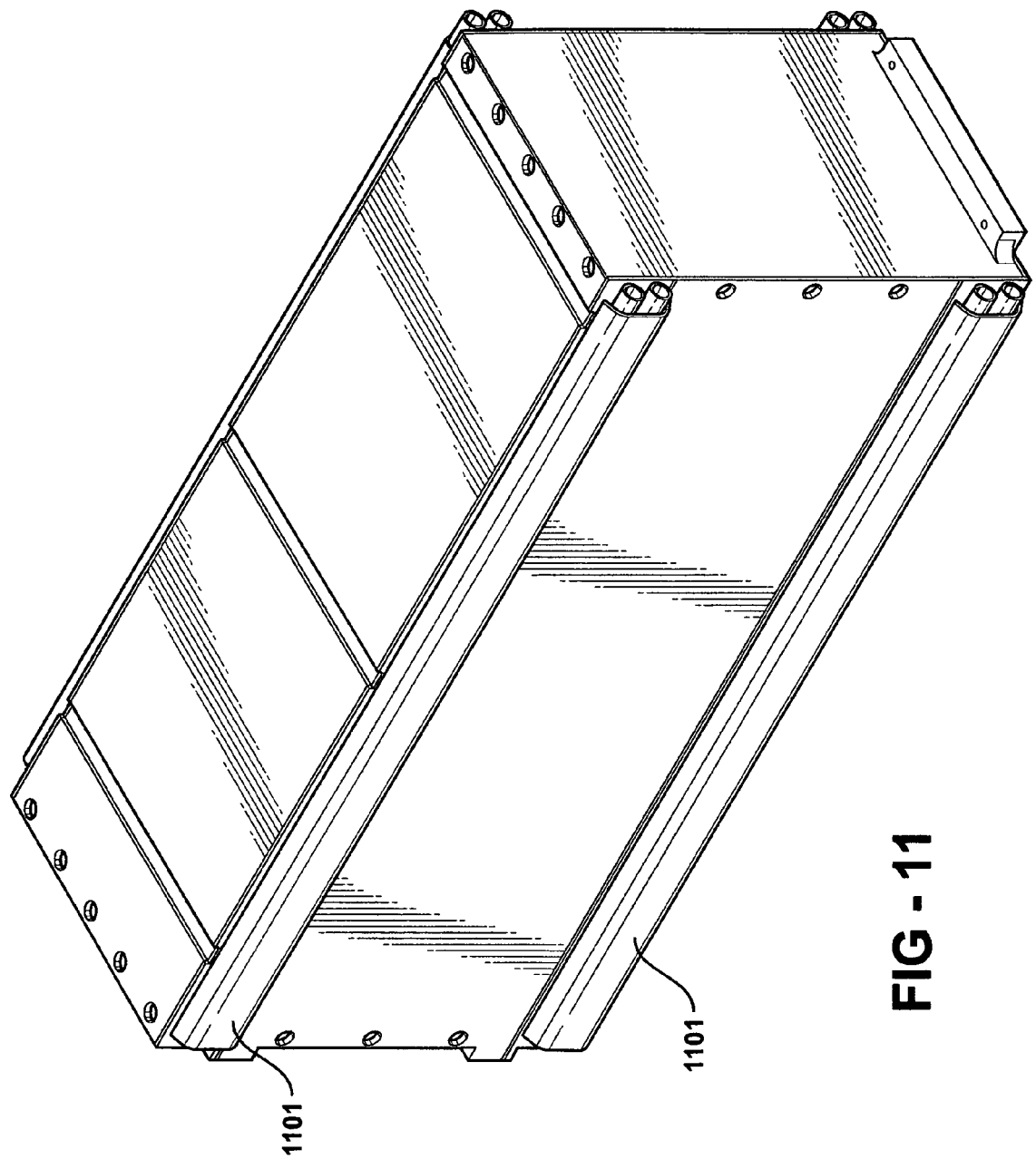
FIG. 11 is a perspective view of a battery system, the battery system having retention devices securing the flow channels.

Preferably, the modular battery system of the present invention has a cooling manifold comprising a series of flow channels 1001 and 1002. Referring to FIGS. 9 through 11, flow channels 1001 and 1002 are preferably integrated to form a coolant manifold, which transfers coolant or other medium to and from the battery modules. For ease of assembly and maintenance, the flow channels may be an interlocking series of flow channels as described in U.S. patent application Ser. No. 11/252,925 entitled Modular Battery System and filed on Oct. 18, 2005, which is hereby incorporated herein by reference. The flow channels 112 may be constructed of any material that may inhibit the leakage of coolant from the flow channels 112. Preferably, the flow channels 112 are constructed of a light weight material, such as any known polymer. The applicable polymers may include polystyrene, polypropylene and polysulfone.

As illustrated, the battery modules 100 are set side by side, preferably interlocked, and the flow channels 1001 and 1002 direct the flow of coolant to the coolant inlets 901, through the battery module 100 and out the coolant outlet 902. The flow channels 1001 and 1002 may be constructed of any material that may inhibit the leakage of coolant from the flow channels 1001 and 1002. Preferably, the flow channels 1001 and 1002 are constructed of a light weight material, such as any known polymer. The applicable polymers may include polystyrene, polypropylene and polysulfone. This type of flow is referred to as a "serial" connection, since the coolant is routed from one battery housing the adjacent battery housing.

A system cover, a system base, a first lateral wall and a second lateral wall directly opposed to one another and secured to the system base and system cover, and a front wall and a rear wall directly opposed to one another and secured to the system base, system cover and each of the lateral walls. The various sides are connected using bolts or other securing mechanism.

The battery system may also include all of the components required to cool the system. For example, the battery system may include a radiator, fan, pump, overflow bottle, coolant connections, manifolds, control of the system, and monitoring of the system. Further, power to control the fan and pump may be provided externally.

While the invention has been illustrated in detail in the drawings and the foregoing description, the same is to be considered as illustrative and not restrictive in character as the present invention and the concepts herein may be applied to any formable material. It will be apparent to those skilled in the art that variations and modifications of the present invention can be made without departing from the scope or spirit of the invention. For example, the flow of coolant may follow a different path depending on the particular battery modules incorporated, other electronics may be used to monitor the system, any multiple of subsystems may be disposed in the system housing depending of the size of the system housing and the intended application, any multiple of battery modules may be disposed in the system housing depending of the size of the system housing and the intended application. Thus, it is intended that the present invention cover all such modifications and variations of the invention that come within the scope of the appended claims and their equivalents.

We claim:

1. A battery module comprising:
  a first end wall having a first end wall semi-enclosure and a first end plate, wherein the first end wall semi-enclosure and the first end plate align to form a first flow channel therebetween;
  a first end wall manifold having a first inlet and a first outlet that are connected to, and in fluid communication with, the first flow channel such that a first fluid portion flows from the first inlet through the first flow channel and then through the first outlet;
  a second end wall having a second end wall semi-enclosure and a second end plate, wherein the second end wall semi-enclosure and the second end plate form a second flow channel therebetween;
  a second end wall manifold having a second inlet and a second outlet that are connected to, and in fluid communication with, the second flow channel such that a second fluid portion flows from the second inlet through the second flow channel and then through the second outlet; and at least one stacking segment aligned between the first and second end walls, the at least one stacking segment including:
a dual sided segment with an external side configured, along with the first end wall, to define at least in part a first plurality of compartments when positioned in opposition to the first end wall; and
a semi-enclosure wall configured, along with the second end wall, to define at least in part a second plurality of compartments when positioned in opposition to the second end wall, wherein
the semi-enclosure wall and an internal side of the dual sided segment align to form at least one stacking segment flow channel therebetween, and wherein each of the at least one stacking segments further comprises:
a stacking segment manifold, the stacking segment manifold having an inlet and an outlet that are connected to, and in fluid communication with, the at least one stacking segment flow channel.

2. The battery module of claim 1, the at least one stacking segment further comprising a flow support set between the internal side of the dual sided segment and the semi-enclosure wall and configured to divert a fluid within the at least one stacking segment flow channel channel into intimate contact with both the semi enclosure wall and the internal side of the dual sided segment.

3. The battery module of claim 1, wherein:
the first end wall includes a plurality of protrusions;
the second end wall includes a plurality of protrusions;
the at least one stacking segment includes a plurality of protrusions formed on the external side of the dual sided segment and includes a plurality of protrusions formed on the semi-enclosure wall;
the protrusions of the first end wall are configured to abut the protrusions of the semi-enclosure wall providing separation of the first plurality of compartments from one another when the at least one stacking segment is in opposition to the first end wall; and
the protrusions of the second end wall abut the protrusions of the external side of the dual sided segment providing separation of the second plurality of compartments from one another when the at least one stacking segment is in opposition to the second end wall.

4. The battery module of claim 3 further comprising a plurality of locking pins, wherein;
each protrusion of the first end wall abuts one of the protrusions of the semi-enclosure wall to form a plurality of locking cavities when the at least one stacking segment is in opposition to the first end wall;

each protrusion of the second end wall abuts one of the protrusions of the external side of the dual sided segment to form a plurality of locking cavities when the at least one stacking segment is in opposition to the first end wall; and
each of the plurality of locking pins is disposed in a respective one of the locking cavities and secures opposing protrusions into a desired position.

5. The battery module of claim 1, further comprising a module interlock mechanism.

6. The battery module of claim 1 further comprising electrochemical cells, each of the electrochemical cells having a positive terminal and a negative terminal, further comprising a plurality of electrical interconnects, the interconnects electrically connecting said terminals.

7. The battery module of claim 1, wherein the at least one stacking segment comprises:
a first stacking segment aligned between the first and second end walls, the first stacking segment including a first dual sided segment with an external side in opposition to the first end wall and, along with the first end wall, defining at least in part the first plurality of compartments; and
a second stacking segment aligned between the first and second end walls, the second stacking segment including a first semi-enclosure wall in opposition to the second end wall and defining at least in part the second plurality of compartments.

8. The battery module of claim 1, wherein the at least one stacking segment comprises a first stacking segment aligned between the first and second end walls, the first stacking segment including:
a first dual sided segment with an external side in opposition to the first end wall and, along with the first end wall, defining at least in part the first plurality of compartments; and
a first semi-enclosure wall in opposition to the second end wall and defining at least in part the second plurality of compartments.

9. The battery module of claim 8, wherein the first semi-enclosure wall and an internal side of the first dual sided segment form at least one stacking segment flow channel therebetween.

10. The battery module of claim 2, wherein the flow support includes:
a first curved surface in opposition to a curved surface of the semi-enclosure wall; and
a second curved surface in opposition to a curved surface of the internal side of the dual sided segment.

11. The battery module of claim 1, wherein the stacking segment manifold is integrated into the dual sided segment.

* * * * *